United States Patent [19]

Boer

[11] 4,393,805

[45] Jul. 19, 1983

[54] PIPELINE PIG FOR LINING PIPE LINES

[75] Inventor: Hubert Boer, Reken, Fed. Rep. of Germany

[73] Assignee: diga-die gasheizung GmbH, Essen, Fed. Rep. of Germany

[21] Appl. No.: 325,621

[22] Filed: Nov. 30, 1981

[30] Foreign Application Priority Data

Dec. 11, 1980 [DE] Fed. Rep. of Germany ....... 3046608

[51] Int. Cl.³ .............................................. B05C 7/00
[52] U.S. Cl. .................................... 118/105; 118/103; 118/DIG. 10; 15/104.05
[58] Field of Search ............... 118/105, DIG. 10, 254, 118/103; 15/104.05, 104.19; 425/460

[56] References Cited

U.S. PATENT DOCUMENTS

| 528,132 | 10/1894 | Jess | .................................... 15/104.19 |
| 2,480,358 | 8/1949 | Curtis et al. | |
| 3,111,431 | 11/1963 | Weaver | ....................... 118/DIG. 10 |
| 3,135,629 | 6/1964 | McLean | |
| 3,363,301 | 1/1968 | Delaruelle et al. | |
| 3,950,461 | 4/1976 | Levens | |

FOREIGN PATENT DOCUMENTS 1263464 2/1972 United Kingdom .

Primary Examiner—John P. McIntosh
Assistant Examiner—M. B. Calligaris
Attorney, Agent, or Firm—Martin A. Farber

[57] ABSTRACT

A pipeline pig for lining pipe lines with an internal coating of a solidifying plastic composition with which the pipe line is spread by means of the pig, the pipeline pig having at least one spreader body and at least one forward and one rear guide body. The guide body comprises at least three narrow, resiliently elastic guide pieces bent into U-form comprising a middle part with forward and rear U-legs at the ends and rounded transitions from the middle part to the U-legs, the middle parts extending in the axial direction of the pipeline pig for guidance of the pipeline pig in the pipe line by abutment on the inner wall of the pipe line and being offset in relation to one another in the circumferential direction, the forward U-legs being non-displaceably secured in the axial direction in the pig and the rear U-legs being displaceably mounted in the axial direction in the pig and secured to a common bearing.

7 Claims, 1 Drawing Figure

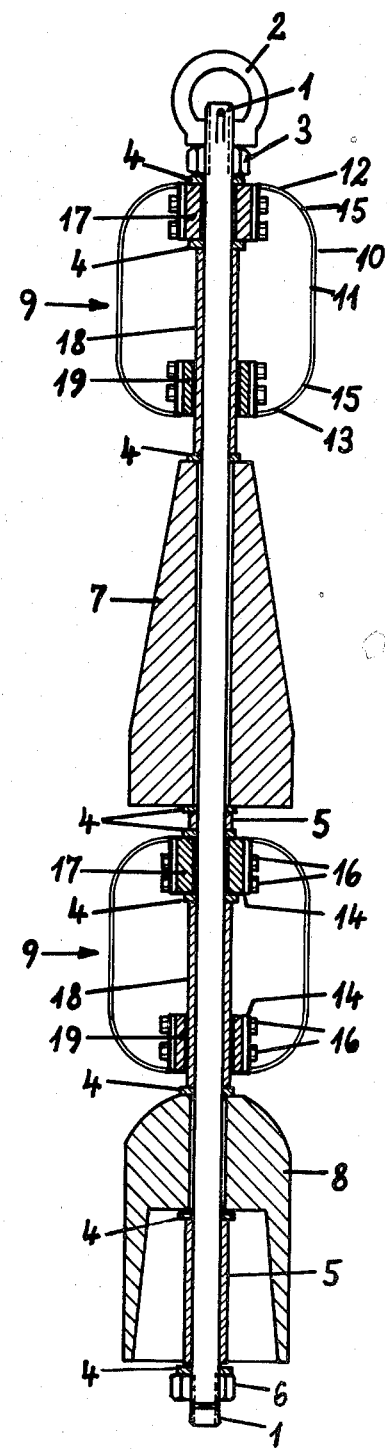

PIPELINE PIG FOR LINING PIPE LINES

The invention relates to a device, ordinarily called a pipeline pig, plug, swipe or plough, for lining pipe lines with an internal coating of a solidifying plastic composition with which the pipe line is spread by means of the pig.

It is known to line pipe lines with an internal coating consisting of a solidifying, plastic composition. Corrosion-resistance synthetic resin compositions, for example on the basis of epoxy resin and bitumen, are preferably used for this purpose. The spreading of the pipe line with the plastic composition takes place by charging a quantity of plastic composition corresponding to the diameter and length of the pipe line and to the thickness of the internal coating into one end of the pipe line and then pulling a pipeline pig through the pipe line, in order to distribute the composition over the circumference and length of the pipeline and press it against the internal wall of the pipe line, to produce the desired wall thickness of the coating and to smooth the surface of the coating. This method is used primarily in underground pipe lines, especially steel pipes and cast iron pipes. The method is used especially in pipe line networks of public gas supply systems and also water supply systems, in order to seal off and secure damaged or leaky pipe lines, with corrosion damage, laid in the earth, coupling boxes which have become leaky and the like.

In this way the necessity is avoided of blocking roads, tearing up and excavating the road surface with high expenditure of costs, laying a completely new pipe line and newly connecting all the domestic connections of the individual houses to this pipe line, and finally repairing the road surface again. When the pipe line is spread with the plastic composition it is even possible to fill already existing holes in the pipe wall and seal them durably.

Various kinds of pipeline pigs are known for spreading the plastic composition in the pipe line. The known pigs possess at least one spreader body, as a rule two or more, where a forward spreader body, formed as a star or a cone, pushes the composition before it through the pipe line, distributes it over the circumference of the pipe line and presses it against the inner wall of the pipe line in a specific coating thickness, while one or more slightly tapered or cylindrical spreader bodies are intended to produce the exact wall thickness of the internal coating and smooth the lining. Moreover the pipeline pigs possess at least one forward guide body and a rear guide body arranged in front of the last spreader body. The guide bodies are intended to support themselves on the inner wall of the pipe line and guide the pig coaxially through the pipe line. The guide bodies of the known pigs possess a plurality of guide pieces distributed over the circumference, for example in the form of resiliently arranged rollers or in the form of resiliently elastic spacer members of rubber or in the form of radial strip steel springs with skids on the ends, or the like, each of the guide pieces distributed over the circumference of the guide body being resiliently elastically yieldable in itself alone and independently of the other guide pieces, and furthermore by reason of manufacturing tolerances etc. the spring forces in the individual guide pieces are not exactly equal, but there are necessarily more or less great differences between the spring forces of the individual guide pieces. If therefore constrictions of cross-section occur in the pipe line and the guide body is compressed radially by the pipe wall, its guide pieces with a lower spring force yield more than the guide pieces with greater spring force which are not pressed radially inwards or are so pressed only to a slighter extent, so that the cross-section of the guide body does not reduce concentrically but only unilaterally, and consequently the pig is no longer guided centrally and coaxially, but eccentrically through the pipe line. In the same way such eccentricities can occur in the case of non-circular pipe cross-sections and also when the plug of composition forced by the pig through the pipe line does not exert a uniform radial pressure upon the spreader bodies, but for example at the bottom of the pipe line, the radial pressure of the composition on the spreader body is greater, so that the pig is lifted. Therefore the known pipeline pigs possess the disadvantage that their guide systems do not guarantee an exact central and coaxial guidance of the pig in the pipe line, and therefore it is not possible to produce a lining with a uniform and regular wall thickness over the entire circumference. On the contrary the danger even exists of such great eccentricity that the spreader bodies come, on one side, into contact with the pipe wall and thus uncoated parts in the pipe line are caused. In order to counter this danger one is compelled to make the diameter of the spreader bodies so much smaller than the pipe diameter that a coating takes place with adequate security at all points of the circumference with the requisite wall thickness, it being accepted that the lining is in part far thicker than necessary. This not only necessitates greater quantities of plastic composition and higher material costs, but also leads to an undesired reduction of the open pipe line cross-section and thus to a reduction of the pipe line capacity.

The invention is based upon the problem of producing a pipeline pig of the initially stated kind which possesses an exactly central and coaxial guidance in the pipe line, therefore with which it is possible to achieve an exactly uniform coating thickness of the lining over the entire circumference and which therefore renders possible a material-saving and cost-saving internal coating.

BRIEF DESCRIPTION OF THE DRAWINGS

The FIGURE shows a pipeline pig according to the present invention.

The solution in accordance with the invention to this problem is effected in the manner that the guide body (9) comprises at least three narrow, resiliently elastic guide pieces (10) bent into U-form, comprising a middle part (11) with forward and rear U-legs (12, 13) at the ends and rounded transitions (15) from the middle part (11) to the U-legs (12, 13), the middle parts (11) extending in the axial direction of the pipeline pig for the guidance of the pipeline pig in the pipeline by abutment on the inner wall of the pig and being offset in relation to one another in the circumferential direction, the forward U-legs (12) being non-displaceably secured in the axial direction in the pig and the rear U-legs (13) being displaceably mounted in the axial direction in the pig and secured to a common bearing (19).

Further in accordance with the invention the spreader bodies (7, 8) and guide bodies (9) are pushed onto a rod (1) and secured thereon, the forward U-legs (12) being secured to a tubular body (17) pushed onto the rod (1), the tubular body being arrested against axial displacement by a spacer sleeve (18) pushed onto the rod (1), on which spacer sleeve a tubular body (19) is axially displaceably mounted, the rear U-legs (13) being secured to the tubular body (19).

With the above and other objects and advantages in view, the present invention will become more clearly understood in connection with the detailed description of a preferred embodiment, when considered with the accompanying drawing, the only FIGURE of which shows a pipeline pig according to the invention.

The pipeline pig in accordance with the invention includes a rod 1, on the forward end of which an annular nut 2 and a lock nut 3 are screwed for the securing of a cable with which the pipeline pig is drawn through a pipe line (not shown). Pushed on the rod 1 are a forward spreader body 7, a rear spreader body 8 and a forward and a rear guide body 9, respectively, with washers 4 and spacer sleeves 5 and 18, and tubular bodies 17, which are held together and secured on the rod 1 by a nut 6 screwed onto the rear end of the rod 1, these members being held together between the nut 6 and the lock nut 3. This simple type of construction makes possible an easy and rapid assembly and dismantlement of the pipeline pig so that after use it may be cleaned, before residues of adhering plastic composition solidify.

The forward, tapered spreader 7 made of synthetic plastic material with a pointed forward end and a cylindrical or approximately cylindrical rear end has the task of forcing the plastic composition through the pipe line and in doing so distributing it over the circumference of the pipe line and applying it in a predetermined coating thickness to the pipe wall of the pipe line. The diameter of the cylindrical rear end of the spreader 7 is dimensioned in accordance with the coating thickness to be applied and the diameter of the pipe line. The rear spreader body 8 made of synthetic plastic material has a rounded forward end face, the diameter of which is smaller than the diameter of the rear end of the spreader body 7. The circumferential surface is slightly tapered and is cylindrical at its rear end. The rear part of the spreader body 8 is formed as a hollow body with slight wall thickness so that it is easily deformed under slight pressure and can adapt itself to non-circular pipe cross-sections. The rear spreader body 8 has the task of spreading the composition applied to the pipe wall by the forward spreader body 7, to exactly the desired predetermined wall thickness of the coating, in doing so re-closing the grooves generated by the rear guide body 9 in the coating and then smoothing the lining. In place of the form of embodiment as illustrated in the example of embodiment, which has proved especially advantageous, it is also possible to use one spreader body or more than two spreader bodies, and naturally it is also possible to use spreader bodies of other suitable materials and with other forms, for example, in place of the forward frusto-conical spreader body 7, a substantially disc-shaped known spreader body with a star-shaped cross-section.

The pipeline pig possesses at least one forward and one rear guide body 9. The greater is the distance between the guide bodies 9, the more easily is it possible naturally to achieve an exactly axial orientation of the scraper in the pipe line. Therefore the forward guide body 9 is advantageously arranged at the tip of the pig before the first spreader body and the rear guide body 9 is arranged before the last spreader body. According to the length of the pig or the number of utilized spreader bodies, it is also possible to use more than two guide bodies 9. The guide body 9 comprises at least three narrow, resiliently elastic guide pieces 10 bent into U-form which comprise a middle part 11 with U-legs 12, 13 at its ends and of rounded transitions 15 from the middle part 11 to the U-legs 12, 13. The resiliently elastic guide pieces 10 can be made for example of narrow sheet metal strips or spring steel strips. Their middle parts 11, which are applied to the inner wall of the pipe for the guidance of the pig in the pipe line, extend in the axial direction and are offset in relation to one another in the circumferential direction. Since a slight width of the middle parts 11 is adequate for this guidance task, the narrowest possible guide pieces 10 are advantageously used. Experiments have proved that in the case of pipe nominal widths below 80 mm., three guide pieces 10 distributed uniformly on the circumference are adequate. In the case of pipe diameters of 80 mm., 100 mm., 125 mm. and 150 mm. the use of four guide pieces 10 is advisable, as represented in the example of the embodiment in the drawing. In the case of greater pipe nominal widths of 200 mm. and above it will be advantageous to use six to eight or even more guide pieces. The forward U-legs 12 of the guide pieces 10 are secured non-displaceably in the axial direction in the pig while the rear U-legs 13 are mounted displaceably in the axial direction in the pig and secured on a common bearing 19. This takes place, in further advantageous development of the invention, in a manner in which the forward U-legs 12 are secured on a tubular body 17 pushed on the rod 1 and arrested against axial displacement by a spacer sleeve 18 pushed onto the rod 1, as the tubular body 17 is made fast at the forward guide body 9 between spacer sleeve 18 and lock nut 3 and at the rear guide body 9 between spacer sleeve 18 and spreader body 7 with spacer sleeve 5. A tubular body 19 to which the rear U-legs 13 are secured is axially displaceably mounted on the spacer sleeve 18. The U-legs 12, 13 are secured at their bent-over ends 14 by means of screws 16 to the tubular body 17 or to the tubular body 19 as the bearing respectively.

By appropriate dimensioning of the width and thickness of the guide pieces 10 and of the hardness of the spring steel, the spring force in the guide bodies 9 is dimensioned so that no undesired radial compression of the guide bodies 9 can take place, for example due to the pressure of the plug of composition pushed through the pipe line by the pig, upon the guide body 9 and its parts or upon one of the spreader bodies. Such forces therefore cannot move the pipeline pig out of its coaxial position in the pipe line into an eccentric position in the cross-section of the pipe line. Due to the common securing of the U-legs 12 on the tubular body 17 and due to the securing of the U-legs 13 on the common bearing 19 the object is achieved that the resiliently elastic guide pieces 10, on the occurrence of radial forces, cannot yield individually and independently of one another, but only in common. If therefore due to constrictions of cross-section or in non-circular pipe line sections a radial pressure is exerted upon the guide body 9, all the guide pieces 10 must yield resiliently elastically in common, so that the cross-section or diameter of the guide body cannot reduce unilaterally and eccentrically, but always reduces on the entire circumference regularly while retaining its coaxial position in the pipe line. In this case the roundded transitions 15 have the technical function and effect of an angle between the middle part 11 and its U-legs 12 and 13, which is greater or less than 90° so that the radial forces acting upon the guide pieces 10 do not strike upon flexurally rigid angles, but with variation of the angle at the transitions 15 in accordance with the cross-sectional reduction off the guide body 9, a variation of length of the guide pieces 10 occurs by which the bearing 19 is displaced on the spacer sleeve 18. This displacement can take place without hindrance by the plug of composition since the direction of movement is not directed oppositely to the pressure of the plug of composition, and furthermore no self-locking can occur due to the friction of the middle parts 11 on the pipe wall, since the direction of movement of the bearing 19 is directed oppositely to the movement of the pig in the pipe line. In this way an exact coaxial guidance of the pig in the pipe line is guaranteed and the production of a lining with a uniform coating thickness and especially also the production of a coating with low wall thickness of for example 2.5 mm. is rendered possible. By the use of greater differences between the diameter of the guide bodies 9 and the diameters of the spreader bodies 7, 8 it is however possible according to need to produce coatings with a greater and uniform wall thickness.

I claim:

1. In a pipeline pig for lining a pipe line with an internal coating of a solidifying plastic composition with which the pipe line is spread by means of the pig which is adapted during operative movement of the pig to be drawn in the pipe line in only one direction of movement of the pig with respect to the pig, the pipeline pig having at least one spreader body and at least one forward and one rear guide body, the improvement wherein each said guide body comprises means for exact central and coaxial guiding of the spreader body in the pipe line comprising, at least three narrow, resiliently elastic guide pieces bent into U-form, each of said guide pieces comprising a middle part with forward and rear U-legs at ends thereof and rounded transitions from the middle part to the U-legs, said middle parts extending in an axial direction of the pipeline pig for the exact central and coaxial guidance of the pipeline pig in the pipe line by abutment on an inner wall of the pipe line and being offset in relation to one another in a circumferential direction, means for securing said forward U-legs non-displaceably in the axial direction in the pig, a common bearing means for displaceably mounting said rear U-legs in the axial direction in the pig, said rear U-legs of said guide pieces being secured to said common bearing, said forward U-legs being located forwardly with respect to said only one direction of movement of the pig and said rear U-legs being located rearwardly, opposite with respect to said only one direction of movement of the pig.

2. The pipeline pig according to claim 1, further comprising a rod, said at least one spreader body is disposed on said rod and operatively secured thereon, a first tubular body is inserted on said rod, a spacer sleeve is inserted on said rod and constitutes means for axially non-displaceably holding said first tubular body on said rod, said forward U-legs of said guide pieces are secured to said first tubular body, a second tubular body is axially displaceably mounted on said spacer sleeve, said rear U-legs are secured to said second tubular body, the latter constitutes said common bearing.

3. The pipeline pig as set forth in claim 2, wherein said spreader body and said guide bodies are always exactly centrally and coaxially arranged relative to said rod.

4. The pipeline pig as set forth in claim 1, wherein said middle parts are straight portions parallel to said axial direction in a non-stressed condition outside of the pipe line as well as in a stressed condition inside the pipe line.

5. The pipeline pig as set forth in claim 1, wherein all said middle parts of said guide pieces are always located the same radial distance relative to the axis of the pipe line.

6. The pipeline pig as set forth in claim 1, wherein said at least one spreader body has a shape such that the pig can be drawn in the pipe line in said only one direction of movement during said operative movement.

7. The pipeline pig as set forth in claim 1, wherein all said guide pieces are simultaneously pressed against the inner wall of said pipe line with substantial force.

* * * * *